United States Patent [19]
Johnson et al.

[11] Patent Number: 5,001,716
[45] Date of Patent: Mar. 19, 1991

[54] TUNABLE ELECTRO-OPTIC Q-SWITCH, AND LASERS USING SAME

[75] Inventors: Bertram C. Johnson, Sunnyvale; Richard L. Herbst, Palo Altoo; Glen R. Blevins, San Jose, all of Calif.

[73] Assignee: Spectra Physics, Inc., Mountain View, Calif.

[21] Appl. No.: 500,576

[22] Filed: Mar. 28, 1990

[51] Int. Cl.⁵ .............................................. H01S 3/11
[52] U.S. Cl. ...................................... 372/10; 372/12; 372/20; 372/27; 372/105
[58] Field of Search ...................... 372/10, 12, 20, 18, 372/27, 105

[56]  References Cited

U.S. PATENT DOCUMENTS

| | | | |
|---|---|---|---|
| 3,609,389 | 9/1971 | Bjorkholm | 372/5 |
| 3,628,186 | 12/1971 | Ashkin | 372/18 |
| 3,866,141 | 2/1975 | Milam et al. | 372/20 |
| 3,902,137 | 8/1975 | Hughes | 372/20 |
| 4,630,275 | 12/1986 | Rapoport | 372/18 |
| 4,660,205 | 4/1987 | Harter et al. | 372/18 |

OTHER PUBLICATIONS

Koechner, Colid State laser Engineering, Second Edition, Springer-Verlag (1988), pp. 414–431.

Hecht, Optics, Second Edition, Addison-Wesley Publishing Co. (1987), pp. 303–304.

*Primary Examiner*—Leon Scott, Jr.
*Attorney, Agent, or Firm*—Fliesler, Dubb, Meyer & Lovejoy

[57]  ABSTRACT

A Q-switch for a laser having a resonant cavity including an output coupler, a gain medium and a retro-reflecting mirror is mounted in the resonant cavity between the gain medium and the retro-reflecting mirror. The Q-switch comprises a polarizer and a phase retarding element (such as a Pockels cell) which includes a birefringent substrae, for inducing a controllable phase retardation in the cavity mode in response to an applied electric field. a tiltable mount supports the phase retarding element so that the lasing axis lies essentially in a plane of the crystallographic axis 45° from the direction of polarization, and lies at an adjustable angle relative to the crystallographic axis. A control circuit supplies an applied electric field within the substrate having a first magnitude in a first state and a second magnitude in a seocnd state. In the first state, the phase retarding element induces 90° rotation in a round trip for the cavity mode. In the second state, the phase retarding element induces effectively no rotation (0° or 180°) for the cavity mode. Therefore, the resonant cavity achieves a high extinction ratio by propar adjustment of the adjustable angle.

24 Claims, 4 Drawing Sheets

FIG._1

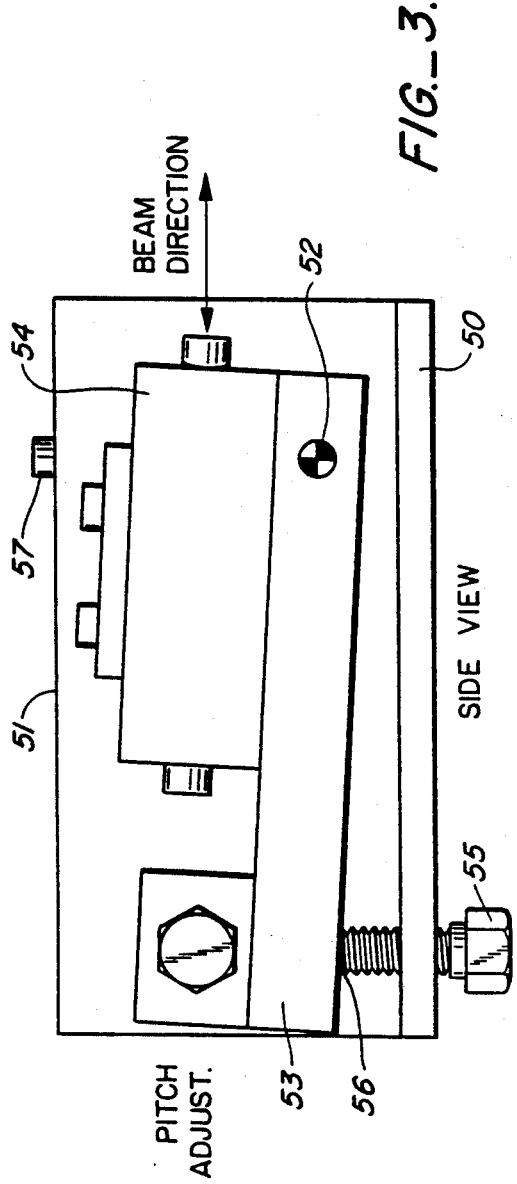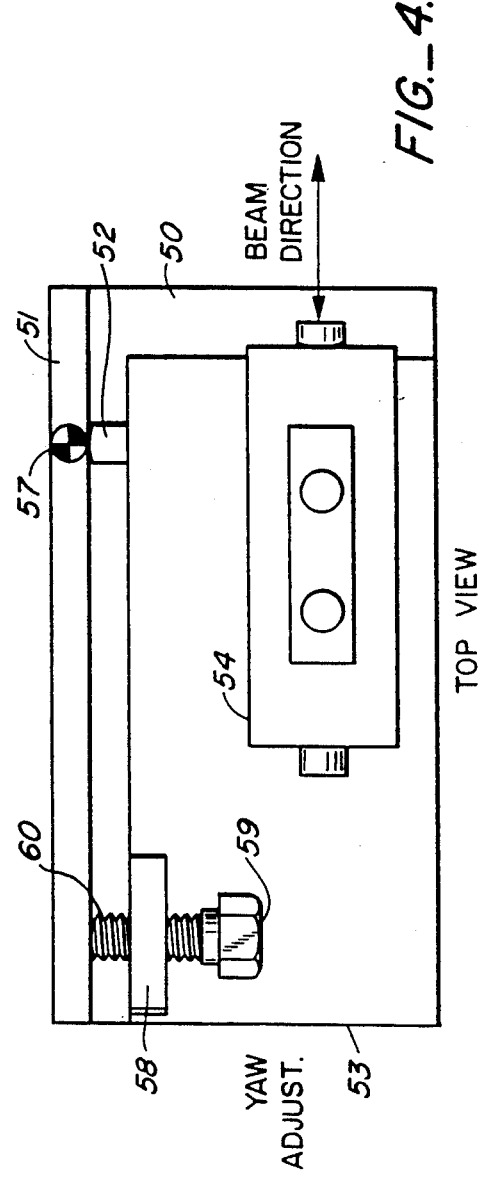

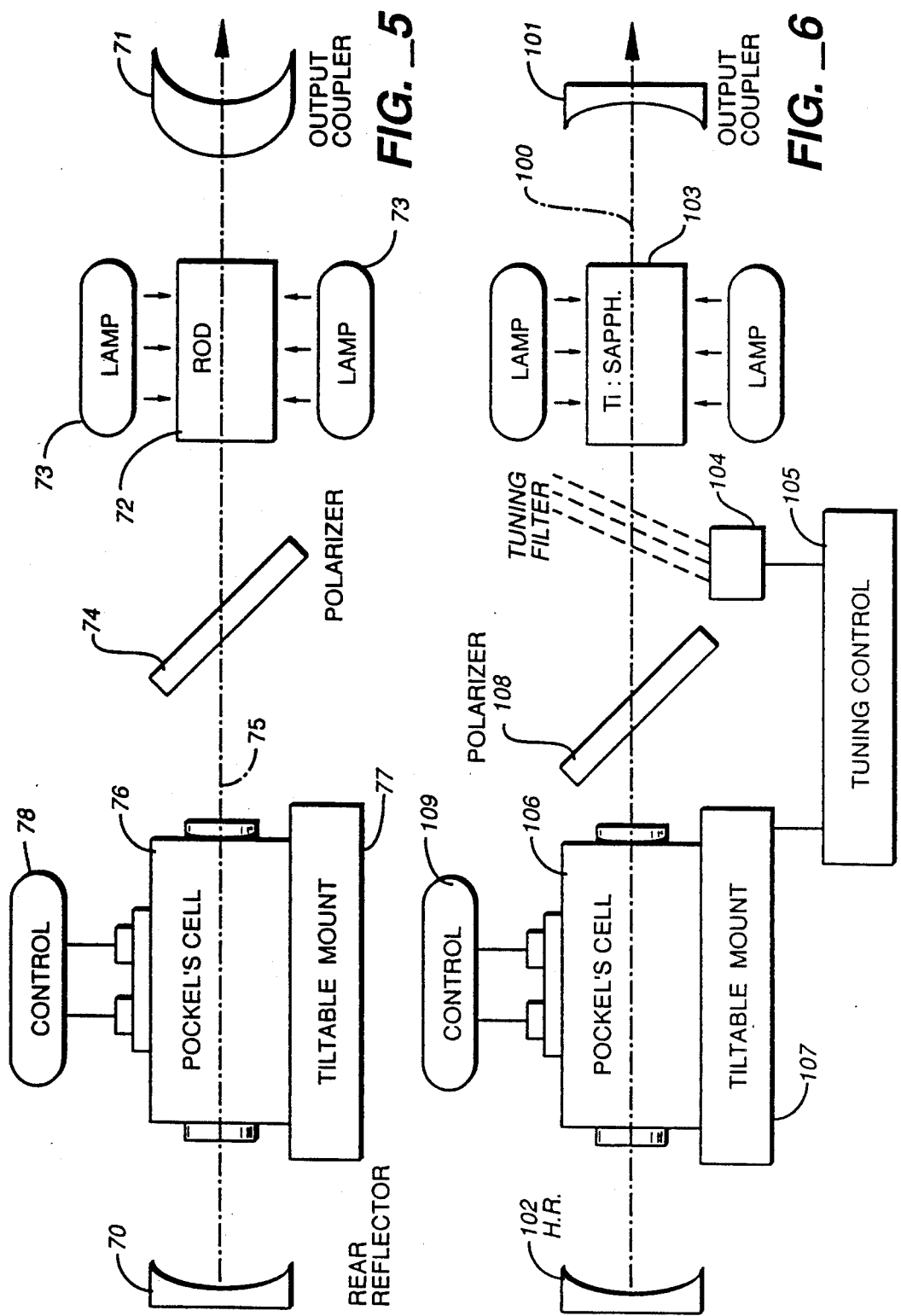

TUNABLE ELECTRO-OPTIC Q-SWITCH, AND LASERS USING SAME

BACKGROUND OF THE INVENTION

1. Field of the Invention

The present invention relates to Q-switched laser systems, and particularly to Q-switches with high hold off thresholds for high power pulsed lasers and for tunable lasers.

2. Description of Related Art

A typical Q-switched laser oscillator includes a resonant cavity with an output coupler, a gain medium with means for exciting the gain medium to induce laser gain within the resonant cavity, and a Q-switch. The Q-switch operates to hold off lasing action in the cavity in a first state, and to allow lasing action in the cavity in a second state.

One kind of Q-switch which can switch the resonant cavity on and off at very high speed, consists of a polarizer, a Pockels cell, and a quarterwave plate aligned in the resonant cavity next to a high reflecting retro-reflector. In the hold off state, the Pockels cell has no polarization effects on light propagating along the lasing axis. The quarterwave plate in the round trip induces a 90° rotation of the light so that it is blocked by the polarizer in the return trip. In the on state, an electric field is energized in the Pockels cell so that it induces a quarterwave retardation, which effectively unwinds the rotation caused by the quarterwave plate, allowing the beam to pass through the polarizer and lasing action to occur.

The quarterwave plate is used so that the Q-switch is in the hold off state when the electric field applied to the Pockels cell is 0 volts. The quarterwave plate can be eliminated, and in such systems, the hold off state requires the applied electric field to be energized on the Pockels cell to induce quarterwave retardation.

The Pockels cell typically consists of a cylindrical crystal of a material such as KD*P, having ring electrodes mounted on each end of the crystal for inducing a longitudinal electrical field in response to applied voltage. The c-axis of the crystal is aligned with the lasing axis, so it has no polarization dependent effects on the beam under zero electric field. When a field is applied, polarization dependent indices of refraction are induced. When the magnitude of the field is correct, then the crystal behaves as quarterwave plate having induced fast and slow axes.

General information concerning Pockels cell Q-switches is provided in Koechner, *Solid-State Laser Engineering, Second Edition*, Springer-Verlag (1988) pages 414–431. Information concerning quarterwave plates can be found in Hecht, *Optics, Second Edition*, Addison-Wesley Publishing Company (1987), pages 303–304.

In typical operation, the laser system is left in the hold off condition in an initial phase of pumping the gain medium. The Q-switch maintains the resonator in a high loss condition, allowing a relatively high amount of stored energy to accumulate in the laser gain medium. At or near the time when the gain medium reaches its peak energy storage level, the Q-switch is switched to the on state by applying a high voltage pulse of appropriate magnitude to offset the phase retardation of the quarterwave plate. This allows the stored energy in the gain medium to generate a high power laser output pulse.

In many laser systems, particularly those with media exhibiting high gains, like Nd:YAG flash lamp pumped lasers, a limiting factor in the amount of Q-switched energy available from the laser is its hold off level. Imperfections in all the major optical components can combine to limit the amount of hold off one can obtain. This condition is also described as the "extinction ratio" of a cavity. In low gain lasers, extinction ratios of 10:1 or even less may be appropriate. However, in high gain systems, ratios of $10^3$–$10^4$:1 or more may be required to hold off oscillation of the laser.

It is desirable to have the hold off state correspond to the non-energized Pockels cell. Therefore, most laser systems include the quarterwave plate within the Q-switch. It is found however that it is very difficult to manufacture a quarterwave plate which induces precisely quarterwave retardation at a preferred wavelength. Thus, the quarterwave plate will induce a retardation which is $\lambda/4 \pm$ a significant error. To the extent that there is an error in the quarterwave plate, the Q-switch will allow a small component of the beam to pass through the polarizer. Using current manufacturing techniques, it is difficult to obtain a quarterwave plate which is accurate at a particular wavelength within about 10%–15%.

According to Hecht, it is known that tilting the quarterwave plate about its fast or slow axis allows tuning of the quarterwave plate to a specific frequency in a narrow region about its nominal value. However, because the quarterwave plates are very thin, the tunable region is too narrow to achieve correction for significant errors.

It is desirable to provide Q-switches with high hold off thresholds, or extinction ratios, for use with high power lasers.

SUMMARY OF THE INVENTION

The present invention provides in one aspect, a method for tuning a Pockels cell Q-switch to improve the hold off threshold. The method includes a step of providing support for a Pockels cell so that the lasing axis lies at an adjustable angle relative to the crystallographic axis of the substrate in the Pockels cell, and essentially in a plane through the crystallographic axis 45° from the polarization direction. Next, the hold off threshold is measured. Then, the adjustable angle is adjusted to optimize the hold off threshold in an iterative process to achieve optimum hold off for the Q-switch. The adjustable angle defines an amount of phase retardation for the laser beam passing through the substrate in the Pockels cell. It is found that tilting the Pockels cell about 0.1 to 0.2 degrees results in a retardation which offsets errors in the typical quarterwave plate.

Alternatively, the quarterwave plate may be eliminated, and the adjustable angle set to cause quarterwave retardation of the laser beam passing through the crystal in the Pockels cell when no electric field is applied.

According to another aspect, the present invention provides a Q-switch for a laser having a resonant cavity including an output coupler, a gain medium and a retro-reflecting mirror. The Q-switch is mounted in the resonant cavity between the gain medium and the retro-reflecting mirror. The Q-switch comprises a phase retarding element which includes an electro-optic substrate for inducing a controllable phase retardation in the cavity mode in response to an applied electric field in the substrate. A polarizer is mounted between the gain medium and the phase retarding element, for passing components of the cavity mode having a direction of polarization. A support structure for the phase retarding element supports the substrate so that the lasing axis lies in a plane through the crystallographic axis 45° from the direction of polarization, and lies at a substrate angle relative to the crystallographic axis. A control circuit, connected to the phase retarding element, supplies an applied electric field within the substrate having a first magnitude in a first state and a second magnitude in a second state. The substrate angle is selected so that, in the first state, the phase retarding element induces a quarterwave retardation amount for the cavity mode for an essentially 90° rotation of polarization in a round trip. In the second state, the phase retarding element induces a half wave retardation, or no retardation amount for the cavity mode, for essentially no rotation of polarization (0° or 180°) in a round trip. Therefore, in the first state the resonant cavity achieves a high extinction ratio by proper selection of the substrate angle and holds off oscillation, and in the second state the resonant cavity has a low extinction ratio and allows lasing action.

The phase retarding element in the preferred system comprises a Pockels cell, and may or may not include a quarterwave plate. Also, in the preferred system, the applied electric field in the first state is essentially 0 volts.

According to yet another aspect, the present invention provides a tunable laser with a tunable electro-optic Q-switch. In this system, the adjustable angle of the substrate in the phase retarding element is adjusted in cooperation with an element tuning the wavelength of the cavity mode. Thus, as the wavelength of the cavity mode varies, the adjustable angle is set to optimize the hold off level for the given wavelength.

Other aspects and advantages of the present invention can be seen upon review of the drawings, the detailed description and the claims which follow.

BRIEF DESCRIPTION OF THE FIGURES

FIG. 3 is a side view of a tiltable mount for a Pockels cell according to one embodiment of the present invention.

FIG. 4 is a top view of the tiltable Pockels cell mount illustrated in FIG. 3.

FIG. 5 is a schematic diagram of an alternative embodiment of a Q-switched laser system according to the present invention.

FIG. 6 is a schematic diagram of a tunable Q-switched laser system according to the present invention.

DETAILED DESCRIPTION

A detailed description of preferred embodiments of the present invention is provided with reference to the Figures. In particular, FIGS. 1–4 illustrate a first embodiment of the present invention. FIGS. 5 and 6 illustrate applications of the present invention in alternative laser systems.

Figure 1:
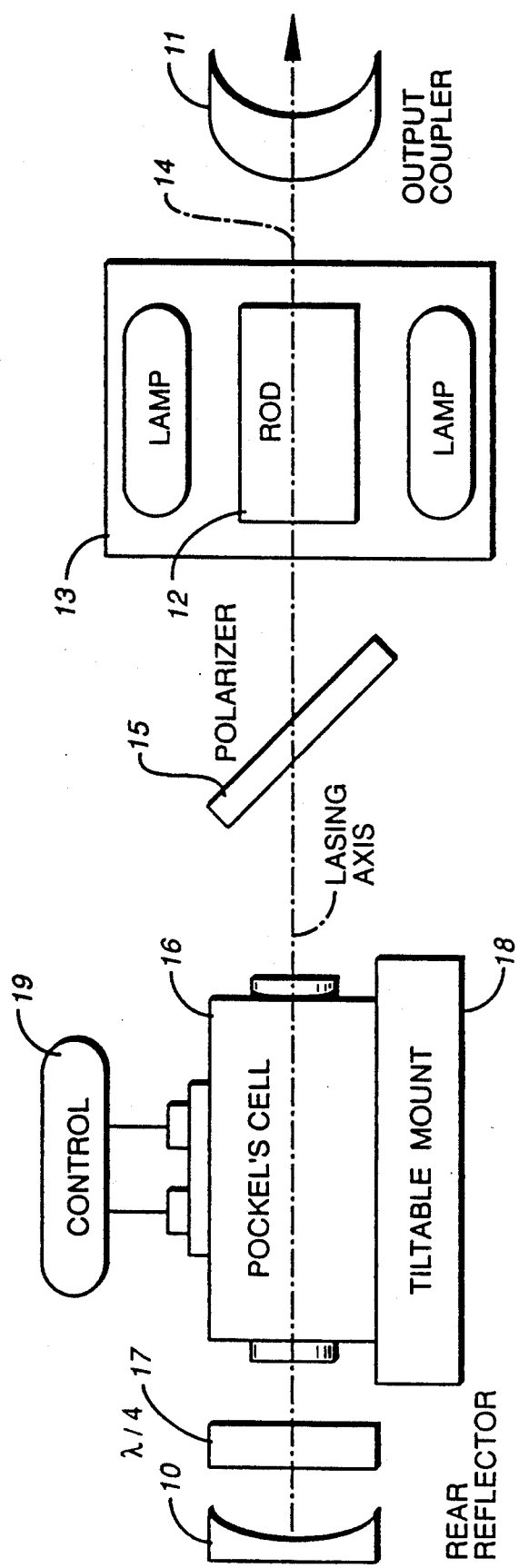
FIG. 1 is a schematic diagram of a Q-switched laser according to the present invention.

FIG. 1 illustrates a Q-switched laser system according to the present invention. The laser includes a resonant cavity defined by a retro-reflector 10 and an output coupler 11. A gain medium 12 such as a rod of Nd:YAG in a flash lamp pumped gain cavity 13, is mounted in the resonant cavity along the lasing axis 14. A polarizer 15 is mounted along lasing axis 14 defining a direction of polarization for the resonant cavity. The Q-switch comprises a Pockels cell 16 and a quarterwave plate 17 mounted on the lasing axis. The Pockels cell 16 is mounted on a tiltable mount 18 such as described in more detail in FIGS. 3 and 4.

The Pockels cell 16 includes a longitudinal field KD*P crystal in an index matching fluid filled housing. The Pockels cell 16 is mounted such that the polarized beam propagates at an angle to the crystallographic c-axis of the KD*P crystal set by the tiltable mount 18. The input polarization direction, determined by the intra-cavity polarizer 15, is oriented at an angle of 45° to the plane defined by the beam propagation direction and the c-axis, as illustrated in FIG. 2.

Control 19 is connected to the Pockels cell 16 to operate the Q-switch in a hold off state in which zero volts are applied across the substrate in the Pockels cell, and an on state, in which a voltage is applied across the substrate sufficient to induce phase retardation to offset or cancel the combined effect of the quarterWave plate and the tilt of the substrate. Control 19 can be implemented using a wide variety of electronic circuits known in the art.

The quarterwave plate 17 can be any of a variety of materials, but is typically constructed of a thin section of oriented crystalline quartz designed to produce a quarterwave phase retardation for a nominal wavelength $\lambda$ between the two polarization components along its fast and slow axes. For typical quarterwave plates the phase retardation is $\lambda/4$ an error of as much as 15%.

Figure 2:
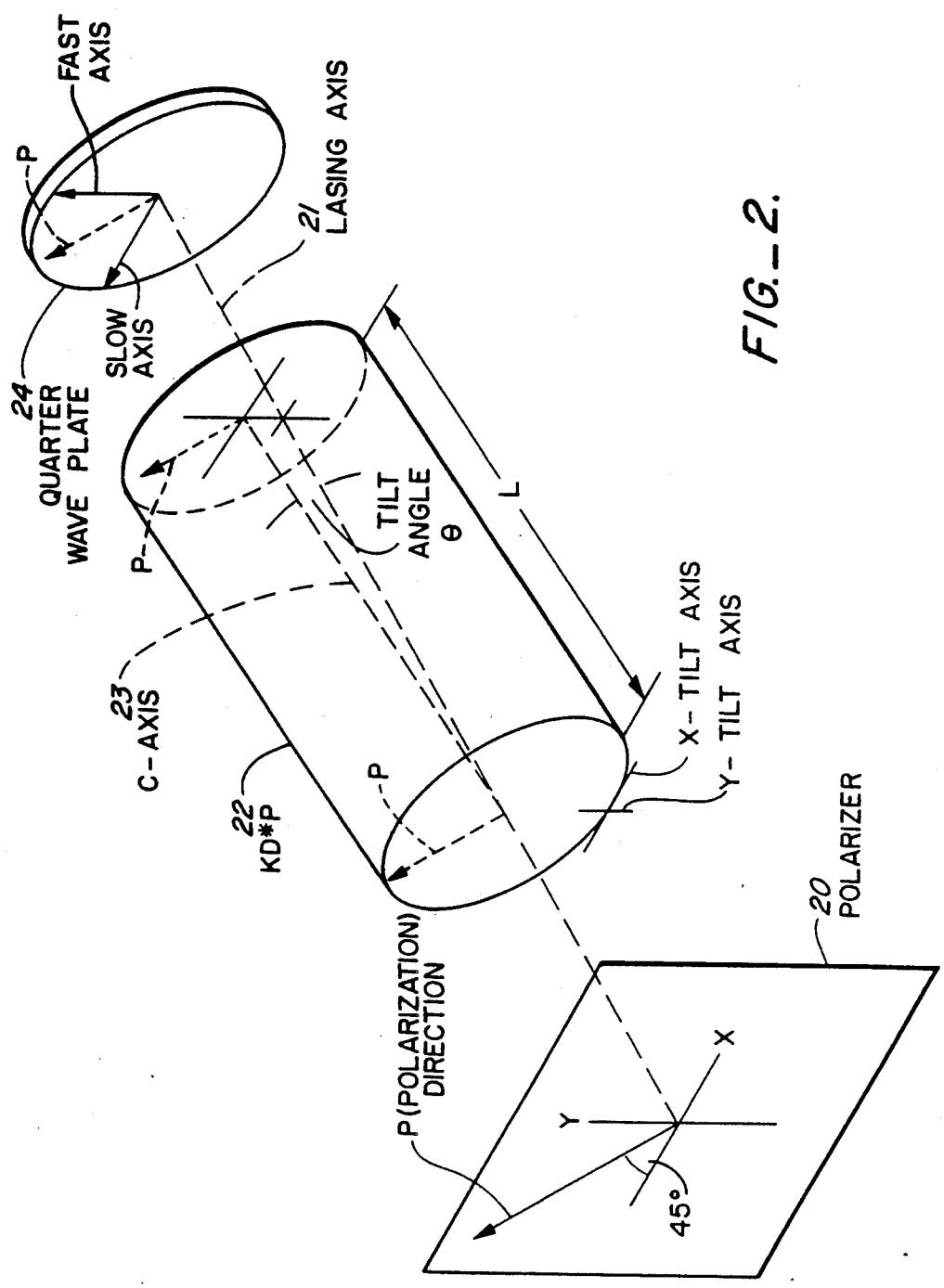
FIG. 2 is a heuristic diagram illustrating the orientation of the polarization direction, the lasing axis, the crystalline axis of the substrate in the Pockels cell, and the orientation of the quarterwave plate according to the present invention.

The orientation of the polarization direction, the KD*P crystal and the quarterwave plate are illustrated in FIG. 2.

In FIG. 2, the polarizer 20 is schematically illustrated as a plane orthogonal to a lasing axis 21. In the figure, x- and y-axes, are projected onto the plane of the polarizer 20. The direction of polarization is 45° from each of the x- and y-axes.

The KD*P crystal 22 is a cylindrical element having a crystallographic c-axis 23. When an electric field is applied of proper magnitude, induced $n_x$ and $n_y$ axes are parallel to the x- and y- axes, respectively.

The tiltable mount 18 allows for tilting the crystal 22 about an x- tilt axis and a y- tilt axis, each 45° from the direction of polarization P.

The quarterwave plate 24 is oriented so that its fast axis and slow axis are aligned with the x- and y- axes.

Because the quarterwave plate causes phase retardation equal to $\lambda/4 \pm$ an error, the KD*P crystal 22 is tilted about either the x- tilt axis or the y- tilt axis, depending on the sign of the error, to select a substrate angle $\theta$ that compensates for the error in the quarterwave plate 24. Thus, as illustrated in FIG. 2, the KD*P crystal 22 is tilted on the x- tilt axis by angle $\theta$, so that the lasing axis lies in a plane of the crystallographic c-axis 23 and the y- axis of the Figure.

If the KD*P crystal 22 is rotated about a first one of the x- or y- tilt axes, it will in combination with the quarterwave plate cause a net increase in phase retardation, while rotation about the other tilt axis will cause a net decrease in phase retardation, of the Q-switch as a whole.

Thus, the method according to the present invention for correcting errors in the quarterwave plate 24 involves introducing a small tilt angle in the c-axis 23 of the KD*P crystal relative to the beam propagation direction (nominally along the resonator axis), and in a plane at ±45° relative to the polarization direction of the beam. The effect of this small tilt is to introduce variable phase error, of controlled sign, direction, and magnitude; such that an arbitrary phase correction can be applied to the system. Thus, a method for tuning the Q-switch to optimize the hold off threshold involves mounting the Pockels cell on a tiltable mount, measuring the hold off threshold, and adjusting the tiltable mount to optimize the hold off threshold.

Now, if the λ/4 plate deviates from the correct optical thickness for quarterwave phase retardation, this means that the phase shift $$\Delta \phi = \frac{2\pi}{\lambda} t_Q (n_e - n_o)$$

is something other than 90°, where $t_Q$ is the quarterwave plate thickness, $n_e$ and $n_o$ are the two principal indices of refraction of the wave plate, and λ is the laser wavelength. If we think in terms of optical thickness, $t_i n_i$, we can see that a phase error from the desired 90° value means that $$\frac{2\pi}{\lambda} |(t_Q n_e - t_Q n_o)| - \pi/2 > 0$$

(plate too thick), or $$\frac{2\pi}{\lambda} |(t_Q n_e - t_Q n_o)| - \pi/2 < 0$$

(plate too thin). An element that allows us to selectively add or subtract optical thickness in either the $n_e$ or the $n_o$ coordinate direction, and to do the addition or subtraction by the correct amount, then allows us to force the equation $$\frac{2\pi}{\lambda} |(t_Q n_e - t_Q n_o \pm (t_c \Delta n_c))| - \pi/2 = 0 \qquad (1)$$

where $t_c \Delta n_c$ is the phase correction term. A tilted longitudinal field KD*P Q-switch is capable of providing the $t_c \Delta n_c$ correction.

A beam propagating down the c-axis of the crystal sees only the "ordinary" index of refraction of the KD*P regardless of its polarization direction, assuming no voltage is applied to the electrodes. Switching on a voltage in effect, causes induced $n_x$ and $n_y$ axes. A beam polarized at 45° to the induced $n_x$ or $n_y$ axes experiences a voltage dependent phase retardation. Typically, a voltage sufficient to produce quarterwave retardation is applied (3-4 KV for KD*P at 1.06 microns) to counteract the effects of the intracavity λ/4 plate. If we tilt the unbiased Q-switch crystal relative to the c-axis, we begin to add a component of the "extraordinary" index, $n_e(\theta)$ to the polarization direction that is perpendicular to the axis of rotation, according to the formula $$n_e(\theta) = \left( \frac{\cos^2 \theta}{n_o^2} + \frac{\sin^2 \theta}{n_e^2} \right)^{-\frac{1}{2}}, \qquad (2)$$

where θ is the (internal) tilt angle relative to the c-axis, $n_o$ is the ordinary index of refraction (1.4934 for KD*P at 1.06 microns), and $n_e$ is the extraordinary index of refraction (1.458 for KD*P at 1.06 microns).

The choice of tilt axis will depend on the sign of correction required; one axis will be used if the λ/4 plate is optically too thick, the other if it is too thin.

Now, a beam propagating through the tilted Q-switch crystal, polarized as shown in FIG. 2 will experience a phase retardation, depending on the tilt angle, θ, given by $$n_e(\theta) t_{KD*P} = \Delta n(\theta) t_{KD*P}, \qquad (3)$$

where $n_e(\theta)$ is the extraordinary index of the Pockels cell crystal as specified in equation (2) above, $n_o$ is the ordinary index, and $t_{KD*P}$ is the crystal length in the propagation direction. Since for KD*P at 1.06 microns $n_o > n_e$, the value $\Delta n(\theta)$ in equation (3) will always be negative.

Now, it can be seen that by inserting a tilted Pockels cell in the beam path (see FIG. 2), we can add a phase correction term, $\Delta n(\theta) t_{KD*P}$, as was described in equation (1) as $t_c \Delta n_c$.

In order to force the equality of equation (1) for a quartz quarterwave plate, since for $$KD*P, \ t_{KD*P} \Delta n(\theta) < 0, \text{ if } \frac{2\pi}{\lambda} |(t_Q (n_e - n_o))| - \pi/2 < 0,$$

we tilt the Pockels cell in the ordinary ($n_o$) - direction of the λ/4 plate. Conversely, if $$\frac{2\pi}{\lambda} |(t_Q (n_e - n_o))| - \pi/2 > 0,$$

we tilt the Q-switch in the extraordinary ($n_e$) - direction.

For a KD*P crystal 1" long, a rotation of approximately 0.1-0.2 degrees will be sufficient to offset a 10% error in the quarterwave plate in a laser system operating at 1.06 microns.

The present invention has been experimentally verified in a Nd:YAG laser having a configuration as illustrated in FIG. 1 in which the hold off threshold for high gain pulsed Nd:YAG laser increased from 33 lamp joules pump input to values in excess of 60 lamp joules. It is expected that even higher hold off values can be achieved.

A mechanism for a tiltable mount allowing rotation about the x- or y- axes in the Pockels cell is illustrated in FIGS. 3 and 4. Of course, a wide variety of tiltable mounts can be utilized as known in the art.

FIG. 3 is a side view of the tiltable mount according to one embodiment. The tiltable mount includes a base 50 and a back wall 51 which is mounted at a right angle to the base 50. A rotation axis 52 extends through a support member 53 into the back wall 51. The Pockels cell 54 is secured on the support member 53 along the propagation axis of the laser beam so that the direction of polarization is 45° from the induced fast and slow axes. A pitch adjustment screw 55 is mounted in base plate 50, and contacts the support member 53 at point 56. The screw 55 is adjusted to control the pitch of the KD*P crystal within the Pockels cell 54 relative to the crystallographic axis in a plane 45° from the direction of polarization.

A top view of the mount is shown in FIG. 4. As can be seen, the back wall 51 supports a rotation axis 57 to which the rotation axis 52 is hinged. A yaw adjustment bearing 58 is mounted o the support member 53 out of the optical path of the Pockels cell 54. A yaw adjustment screw 59 goes through the yaw bearing 58 and contacts the back wall 51 at point 60. Thus the yaw adjustment 59 is used to rotate the Pockels cell about an axis 57 which is perpendicular to the axis 52. The Pockels cell 54 is mounted on the support member 53 so that the fast and slow axes are each parallel to one of axes 52 or 57. If this is not practical such as may be true for an existing laser system, then the pitch and yaw adjustment can be used together to cause tilting along the correct fast or slow axis.

FIG. 5 illustrates an alterative implementation of the present invention. In the illustrated system, the quarterwave plate of the resonator shown in FIG. 1 has been eliminated. Thus, a laser system in FIG. 5 includes a resonant cavity defined by retro-reflector 70 and output coupler 71. A gain medium 72 is mounted within the resonant cavity and includes lamps 73 for exciting laser gain in the gain medium 72. Polarizer 74 is mounted within the resonant cavity in alignment with optical path 75. A Pockels cell 76, with control 78, is mounted on tiltable mount 77, such as that illustrated in FIGS. 3 and 4, between the polarizer 75 and the retro-reflector 70. In fact, the tiltable mount 77 can be adapted for rotation about a single axis in this embodiment. The crystal within the Pockels cell 76 is rotated about the axis in order to cause quarterwave phase retardation when the electric field is not applied across the crystal. This eliminates the need for the quarterwave plate. For a 1" long KD*P crystal, in a longitudinal field Pockels cell, the angle for 90° phase retardation is about internal angle for a laser operating 1.06 microns, such as an Nd:YAG laser.

In the laser system is illustrated in FIG. 4, a hold off in excess of 100 lamp joules has been achieved.

The electro-optic Q-switch such as used in FIGS. 1 and 5 can be applied to a tunable laser system as illustrated in FIG. 6. FIG. 6 is a schematic diagram of a Ti:Sapphire tunable laser system. The tunable laser system includes an output coupler 101, and a retro-reflecting mirror 102, which define an optical path 100 for the cavity mode in the resonant cavity. A flash lamp pumped Ti;Sapphire gain medium 103 is mounted in the resonant cavity.

A birefringent filter 104 is mounted in the cavity, possibly in combination with other tuning means. The birefringent filter 104 is tuned over a range of wavelengths to alter the wavelength of the cavity mode. A tuning control mechanism 105 is coupled to the birefringent filter 104 to control the rate and amount of tuning.

A polarizer 108 and Pockels cell 106 with control 109, are mounted between the birefringent filter 104 and the retro-reflecting mirror 102. The Pockels cell 106 is mounted on a tiltable mount 107 as discussed above. It is tilted so that it induces a quarterwave phase retardation in the cavity mode for any given wavelength. In the system illustrated in FIG. 6, no quarterwave plate is shown. An achromatic quarterwave plate, or, alternatively, a quarterwave plate having a nominal wavelength near the center of the tuning range, could be inserted to reduce the amount of tilt required.

The tuning control mechanism 105 is coupled to the tiltable mount 107 so that the adjustable angle of tilt is set in cooperation with the tuning of the birefringent filter 104.

The tuning control mechanism could be a mechanical servo drive which is calibrated for cooperation with the birefringent filter. Alternatively, the mechanism could include an automatic tilt adjustment that operates in a servo loop by detecting and maximizing hold off thresholds as the wavelength is changed.

The example of a tunable laser provided here is based on a flash lamp pumped Ti:Sapphire system. The invention can be applied however to any tunable laser system, including Ti:Sapphire with other pump sources, and lasers using other types of gain media and pump sources.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. An electro-optic Q-switch for a laser having a resonant cavity including an output coupler, a gain medium and a retro-reflecting mirror, for mounting in the resonant cavity between the gain medium and the retro-reflecting mirror, the resonant cavity supporting a cavity mode on a lasing axis, comprising:

polarizing means, mounted on the lasing axis, for polarizing the cavity mode in a direction of polarization;

phase retarding means, comprising an electro-optic substrate having a crystallographic axis, for inducing controllable phase retardation in the cavity mode in response to an applied electric field in the substrate;

means for supporting the substrate in the phase retarding means so that the lasing axis lies essentially in a plane of the crystallographic axis 45° from the direction of polarization, and lies at an angle relative to the crystallographic axis; and control means, connected to the phase retarding means, for supplying the applied electric field within the substrate having a first magnitude in a first state and a second magnitude in a second state, wherein in the first state the phase retarding means induces essentially 90° polarization rotation in a round trip for the cavity mode, and in the second state the phase retarding means induces essentially no polarization rotation in a round trip for the cavity mode.

2. The Q-switch of claim 1, wherein the phase retarding means comprises:

a plate of birefringent material, having a fast axis and a slow axis orthogonal to the fast axis, and mounted so that the direction of polarization is essentially 45 degrees from the fast and slow axes, and having an optical thickness along the lasing axis equal to a multiple of λ/4 ±an error, wherein λ equals wavelength of the cavity mode; and wherein the substrate has an angular position relative to the lasing axis, and the means for supporting the substrate in the phase retarding means includes means for adjusting position of the substrate to compensate for the error.

3. The Q-switch of claim 1, wherein the phase retarding means comprises a Pockels cell.

4. The Q-switch of claim 1, wherein the phase retarding means comprises:

a Pockels cell including the substrate;

a plate of birefringent material, having a fast axis and a slow axis orthogonal to the fast axis and mounted so that the direction of polarization is essentially 45 degrees from the fast and slow axes, and having an optical thickness along the lasing axis equal to a multiple of λ/4 ±an error, wherein λ equals wavelength of the cavity mode; and wherein the substrate has an angular position relative to the lasing axis, and the means for supporting the substrate in the phase retarding means includes means for adjusting the angular position of the substrate to compensate for the error.

5. The Q-switch of claim 1, wherein the magnitude of the applied electric field in the first state is essentially zero volts.

6. The Q-switch of claim 1, wherein the phase retarding means comprises a longitudinal field Pockels cell.

7. A method for tuning a Q-switch to improve hold off threshold in a laser having a resonant cavity with a lasing axis and a cavity wavelength, the Q-switch including a polarizer defining a direction of polarization, a Pockels cell, a quarterwave plate, and a retro-reflecting mirror mounted in the resonant cavity, the Pockels cell having a substrate with a crystallographic axis; comprising the steps of:

supporting the substrate in the Pockels cell so that the lasing axis lies essentially in a plane of the crystallographic axis 45° from the direction of polarization, and at an adjustable angle relative to the crystallographic axis, measuring the hold off threshold; and adjusting the adjustable angle to optimize the hold off threshold.

8. A method for tuning a Q-switch in a tunable laser having a resonant cavity with a lasing axis and a tunable cavity wavelength, the Q-switch including a polarizer defining a direction of polarization, a Pockels cell having an on state and a hold off state, and a retro-reflecting mirror mounted in the resonant cavity, the Pockels cell having a substrate with a crystallographic axis; comprising the steps, of:

supporting the substrate in the Pockels cell so that the lasing axis lies essentially in a plane of the crystallographic axis 45° from the direction of polarization, and at an adjustable angle relative to the crystallographic axis, whereby the adjustable angle controls an amount of phase retardation of the cavity mode induced by the substrate for a given cavity wavelength; and adjusting the adjustable angle, in cooperation with tuning the cavity wavelength, so that the amount of phase retardation of the cavity mode for the given cavity wavelength is essentially a quarterwave when the Q-switch is in the hold off state.

9. A laser, comprising:

a resonant cavity including an output coupler and a retro-reflecting mirror, for supporting oscillation along a lasing axis of a cavity mode;

a gain medium, including means for supplying pump energy to the gain medium to induce laser gain;

polarizing means, mounted on the lasing axis in the resonant cavity between the gain medium and the retro-reflecting mirror, for polarizing the cavity mode in a direction of polarization;

phase retarding means, mounted in the resonant cavity between the polarizing means and the retro-reflecting mirror, comprising a substrate having a crystallographic axis, for inducing controllable phase retardation in the cavity mode in response to an applied electric field in the substrate;

means for supporting the substrate in the phase retarding means so that the lasing axis lies essentially in a plane of the crystallographic axis 45° from the direction of polarization, and lies at an angle relative to the crystallographic axis; and control means, connected to the phase retarding means, for supplying the applied electric field within the substrate having a first magnitude in a first state and a second magnitude in a second state, wherein in the first state the phase retarding means induces an essentially 90° polarization rotation in a round trip for the cavity mode; and in the second state the phase retarding means induces effectively no polarization rotation in a round trip for the cavity mode.

10. The laser of claim 9, wherein the phase retarding means comprises:

a plate of birefringent material, having a fast axis and a slow axis orthogonal to the fast axis, and mounted so that the direction of polarization is essentially 45 degrees from the fast and slow axes, and having an optical thickness along the lasing axis equal to a multiple of λ/4 an error, wherein λ equals wavelength of the cavity mode; and wherein the substrate has an angular position relative to the lasing axis, and the means for supporting the substrate in the phase retarding means includes means for adjusting position of the substrate to compensate for the error.

11. The laser of claim 9, wherein the phase retarding means comprises a Pockels cell.

12. The laser of claim 9, wherein the phase retarding means comprises:

a Pockels cell including the substrate;

a plate of birefringent material, having a fast axis and a slow axis orthogonal to the fast axis, and mounted so that the direction of polarization is essentially 45 degrees from the fast and slow axes, and having an optical thickness along the lasing axis equal to a multiple of λ/4 ±an error, wherein λ equals wavelength of the cavity mode; and wherein the substrate has an angular position relative to the lasing axis, and the means for supporting the substrate in the phase retarding means includes means for adjusting position of the substrate to compensate for the error.

13. The laser of claim 9, wherein the magnitude of the applied electric field in the first state is essentially zero volts.

14. The laser of claim 9, wherein the phase retarding means comprises a longitudinal field Pockels cell.

15. The laser of claim 9, further including:

means, mounted within the resonant cavity, for tuning the cavity mode over a range of wavelengths; and means, mounted with the means for supporting, for adjusting the angle in cooperation with the means for tuning so that the amount of phase retardation in the first state remains essentially a quarterwave over the range of wavelengths.

16. A tunable laser, comprising:

a resonant cavity including an output coupler and a retro-reflecting mirror, for supporting oscillation of a cavity mode along a lasing axis;

a gain medium, including means for supplying pump energy to the gain medium to induce laser gain;

means, mounted within the resonant cavity, for tuning the cavity mode over a range of wavelengths;

polarizing means, mounted on the lasing axis in the resonant cavity between the gain medium and the retro-reflecting mirror, for polarizing the cavity mode in a direction of polarization;

phase retarding means, mounted in the resonant cavity between the polarizing means and the retro-reflecting mirror, comprising a substrate having a crystallographic axis, for inducing controllable phase retardation in the cavity mode in response to an applied electric field in the substrate;

means for supporting the substrate in the phase retarding means so that the lasing axis lies essentially in a plane of the crystallographic axis 45° from the direction of polarization, and lies at an angle relative to the crystallographic axis;

control means, connected to the phase retarding means, for supplying the applied electric field within the substrate having a first magnitude in a first state and a second magnitude in a second state, wherein in the first state the phase retarding means induces 90° polarization rotation in a round trip for the cavity mode, and in the second state the phase retarding means induces effectively no polarization rotation in a round trip for the cavity mode; and means, mounted with the means for support, for adjusting the angle in cooperation with the means for tuning so that the amount of rotation in the first state remains essentially 90° as the cavity mode is tuned over the range of wavelengths.

17. The laser of claim 16, wherein the phase retarding means comprises a Pockels cell.

18. The laser of claim 16, wherein the magnitude of the applied electric field in the first state is essentially zero volts.

19. The laser of claim 16, wherein the phase retarding means comprises a longitudinal field Pockels cell.

20. The laser of claim 16, wherein the phase retarding means comprises:

a Pockels cell including the substrate;

a plate of birefringent material, having a fast axis and a slow axis orthogonal to the fast axis and mounted so that the direction of polarization is essentially 45 degrees from the fast and slow axes, and having an optical thickness along the lasing axis equal to a multiple of $\lambda/4$ ±an error, wherein $\lambda$ equals a wavelength within the range of wavelengths of the cavity mode, and the error changes as the wavelength of the cavity mode is changed; and wherein the substrate has an angular position relative to the lasing axis, and the means for supporting the substrate in the phase retarding means includes means for adjusting the angular position of the substrate to compensate for the error.

21. The laser of claim 16, wherein the phase retarding means comprises:

a Pockels cell including the substrate;

an achromatic quarterwave plate, having a fast axis and a slow axis orthogonal to the fast axis and mounted so that the direction of polarization is essentially 45 degrees from the fast and slow axes, inducing phase retardation of $\lambda/4$ ±an error, wherein $\lambda$ equals a wavelength within a range of wavelengths; and wherein the substrate has an angular position relative to the lasing axis, and the means for supporting the substrate in the phase retarding means includes means for adjusting the angular position of the substrate to compensate for the error.

22. A tunable laser, comprising:

a resonant cavity, including an output coupler, for supporting oscillation of a cavity mode along a lasing axis;

a gain medium, including means for supplying pump energy to the gain medium to induce laser gain;

means, mounted within the resonant cavity, for tuning the cavity mode over a range of wavelengths; and an electro-optic Q-switch, mounted within the resonant cavity, including means for tuning the Q-switch over the range of wavelengths.

23. The tunable laser of claim 22, wherein the electro-optic Q-switch comprises a Pockels cell.

24. The tunable laser of claim 22, wherein the gain medium comprises Ti:Sapphire.

* * * * *